United States Patent [19]
Karrer

[11] Patent Number: 5,921,603
[45] Date of Patent: Jul. 13, 1999

[54] ATTACHMENT SYSTEM FOR PICKUP TRUCKS

[76] Inventor: Robert B. Karrer, 3489 Fulton Ave., Smithers, Canada, V0J 2N0

[21] Appl. No.: 09/104,188

[22] Filed: Jun. 25, 1998

Related U.S. Application Data

[63] Continuation-in-part of application No. 08/807,752, Feb. 27, 1997, Pat. No. 5,882,058.

[51] Int. Cl.$^6$ .................................................. B62D 33/00
[52] U.S. Cl. .................................. 296/39.2; 296/100.17; 296/100.18
[58] Field of Search .................. 296/39.2, 3, 100.17, 296/100.18, 100.06, 40

[56] References Cited

U.S. PATENT DOCUMENTS

| | | | |
|---|---|---|---|
| 4,575,146 | 3/1986 | Markos | 296/39 R |
| 4,936,724 | 6/1990 | Dutton | 410/110 |
| 4,958,876 | 9/1990 | Diaco et al. | 296/39.2 |
| 4,969,784 | 11/1990 | Yanke | 410/104 |
| 5,052,739 | 10/1991 | Irwin | 296/37.6 |
| 5,127,701 | 7/1992 | Miller | 296/100 |
| 5,150,940 | 9/1992 | Kennedy | 296/39.2 |
| 5,228,736 | 7/1993 | Dutton | 296/100.18 |
| 5,263,761 | 11/1993 | Hathaway et al. | 296/100 |
| 5,393,114 | 2/1995 | Christensen | 296/36 |
| 5,454,612 | 10/1995 | Christensen | 296/3 |
| 5,470,120 | 11/1995 | Christensen | 296/3 |
| 5,494,327 | 2/1996 | Derecktor | 296/3 |
| 5,584,521 | 12/1996 | Hathaway et al. | 296/3 |

FOREIGN PATENT DOCUMENTS 1330572  7/1994  Canada.

*Primary Examiner*—Sherman Basinger
*Attorney, Agent, or Firm*—Rogers & Scott

[57] ABSTRACT

An attachment system is provided which preferably has a pair of elongate anchor rails adapted to rest on the upper surfaces of the respective cargo bed sides, and be fastened thereto in fixed supporting relation. The anchor rails are adapted to be securely affixed to both cargo bed sides and preferably include structure to receive the side walls of a protective bed liner or cargo bed accessories. Each of the anchor rails consists of an elongate member having horizontal and vertical segments. The lower portion of the vertical segment preferably defines an elongate channel adapted to accept a corresponding removable mating member for attachment of the cargo bed liner and the like, and an upstanding ridge is optionally included above the vertical segment to repel water from the cargo bed. The rails are arranged to receive an anchor beam between the rails and adjustable along the lengths of the rails.

10 Claims, 5 Drawing Sheets

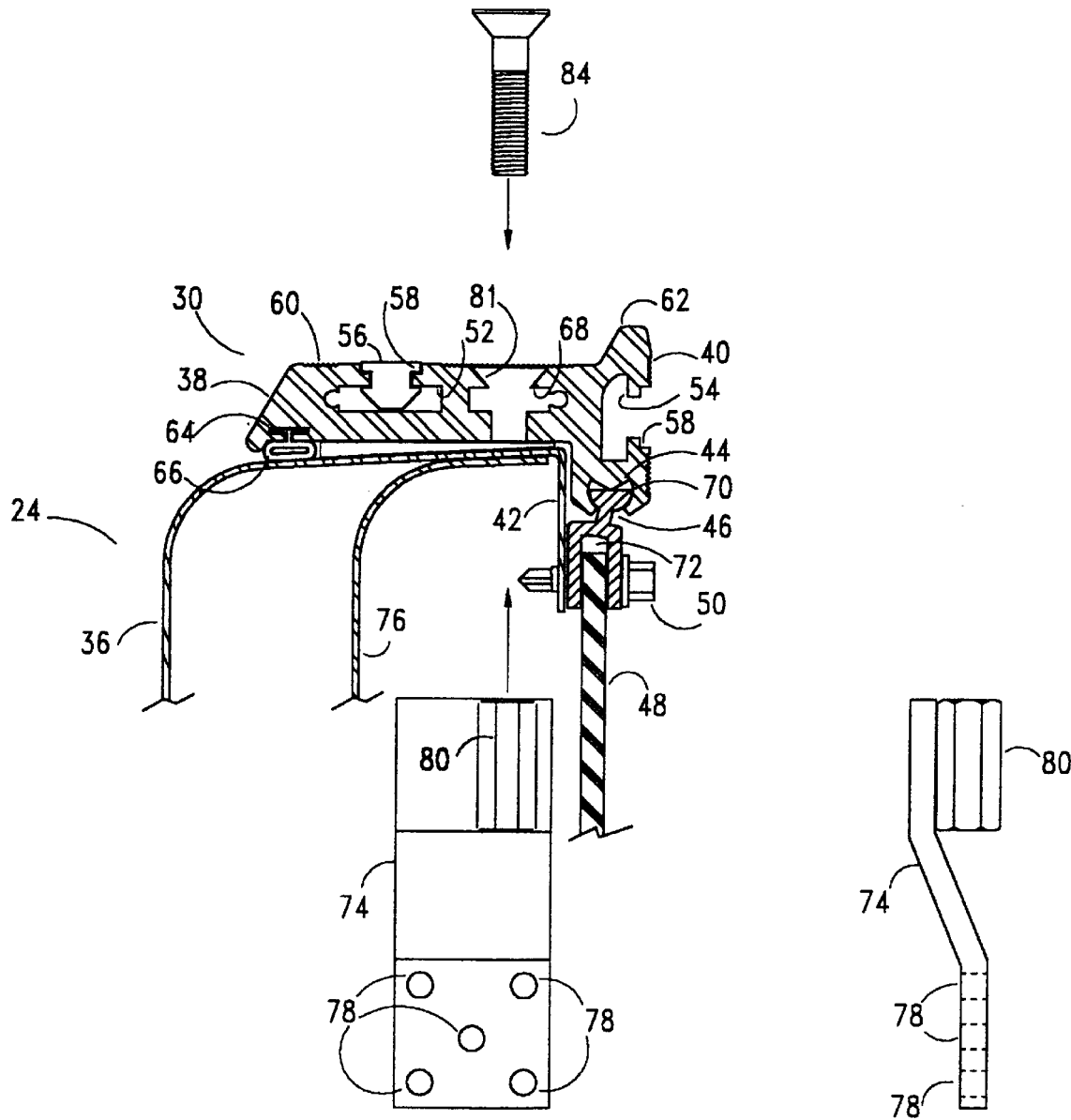

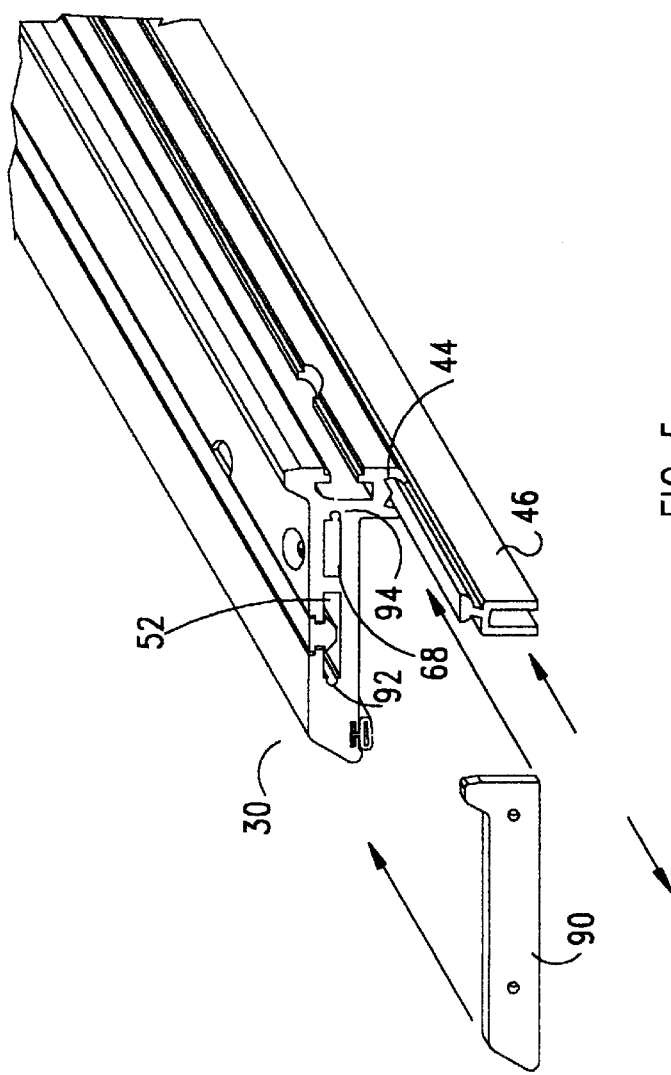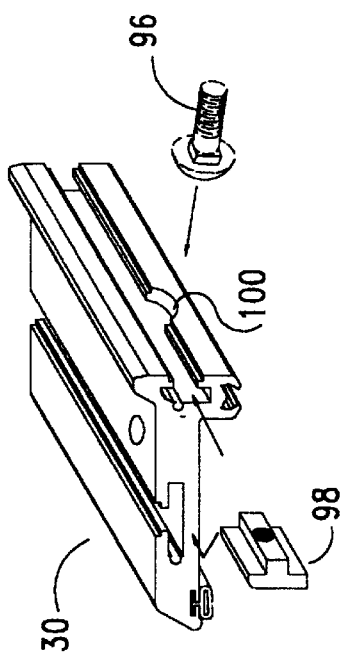

ATTACHMENT SYSTEM FOR PICKUP TRUCKS

This application is a continuation-in-part of application Ser. No. 08/807,752, filed on Feb. 27, 1997, now U.S. Pat. No. 5,882,058.

FIELD OF THE INVENTION

This invention relates to pickup trucks and more particularly to an attachment system which can be coupled to the existing cargo beds of a variety of pickup trucks.

BACKGROUND OF THE INVENTION

It is common practice to add structures to the cargo bed of a pickup truck for a variety of purposes. The basic elements of such structures are usually a pair of rails which attach to the tops of the walls of the cargo bed above the wheel wells. Each of the rails may include a variety of attachment points for use in securing loads, covers, tool boxes, etc. However, there are limitations due to the need for secure connection and also because the side walls vary in shape and they may also diverge slightly to be wider apart adjacent the cab of the truck.

It is an object of the present invention to provide an improved attachment system for the cargo bed of pickup trucks which will provide adequate strength and facilitate the attachment of accessories such as covers, tool boxes, etc.

SUMMARY OF THE INVENTION

The present invention provides an attachment system which preferably has a pair of elongate anchor rails adapted to rest on the upper surfaces of the respective cargo bed sides, and be fastened thereto in fixed supporting relation. The anchor rails are adapted to be securely affixed to both cargo bed sides and preferably include structure to receive the side walls of a protective bed liner or cargo bed accessories. Each of the anchor rails consists of an elongate member having horizontal and vertical segments. The lower portion of the vertical segment preferably defines an elongate channel adapted to accept a corresponding removable mating member for attachment of the cargo bed liner and the like, and an upstanding ridge is optionally included above the vertical segment to repel water from the cargo bed.

The anchor system preferably also includes an adjustable anchor beam to be used across the top of the cargo bed and attached to the inner vertical segments of the anchor rails. The anchor beam preferably has a hollow generally rectangular cross section which has T-slots on both the outer vertical walls and a T-slot on the outer bottom wall to provide anchoring points for cargo restraining devices. It is also preferable, but optional, to include a pair of integral formed outwardly extended ridges on the top outer corners of the anchor beam to act as a weatherguard when used in conjunction with cargo enclosures and the like.

These and other aspects of the present invention will become apparent from the following descriptions of the preferred embodiments of the invention taken in conjunction with the accompanying drawings.

BRIEF DESCRIPTION OF THE DRAWINGS

FIG. 2 is a cross-sectional and partially exploded view of an anchor rail as it is being installed on the truck bed rail and shown in section on line 2—2 of FIG. 1, and also showing an exemplary attachment of a bed liner;

FIG. 3 is a side view of a bracket used in the anchor rail assembly and also seen in FIG. 2;

FIG. 4 is a side view showing exemplary removal of excess material from an anchor rail levelling shim;

FIG. 5 is an exploded perspective view of a portion of the anchor rail of the system and showing structure used to attach the bed liner and an optional end cap;

FIG. 6 is an isometric view of a portion of the anchor rail of the system and showing various accessories which can be used with the system;

DESCRIPTION OF THE PREFERRED EMBODIMENT(S)

Figure 1:
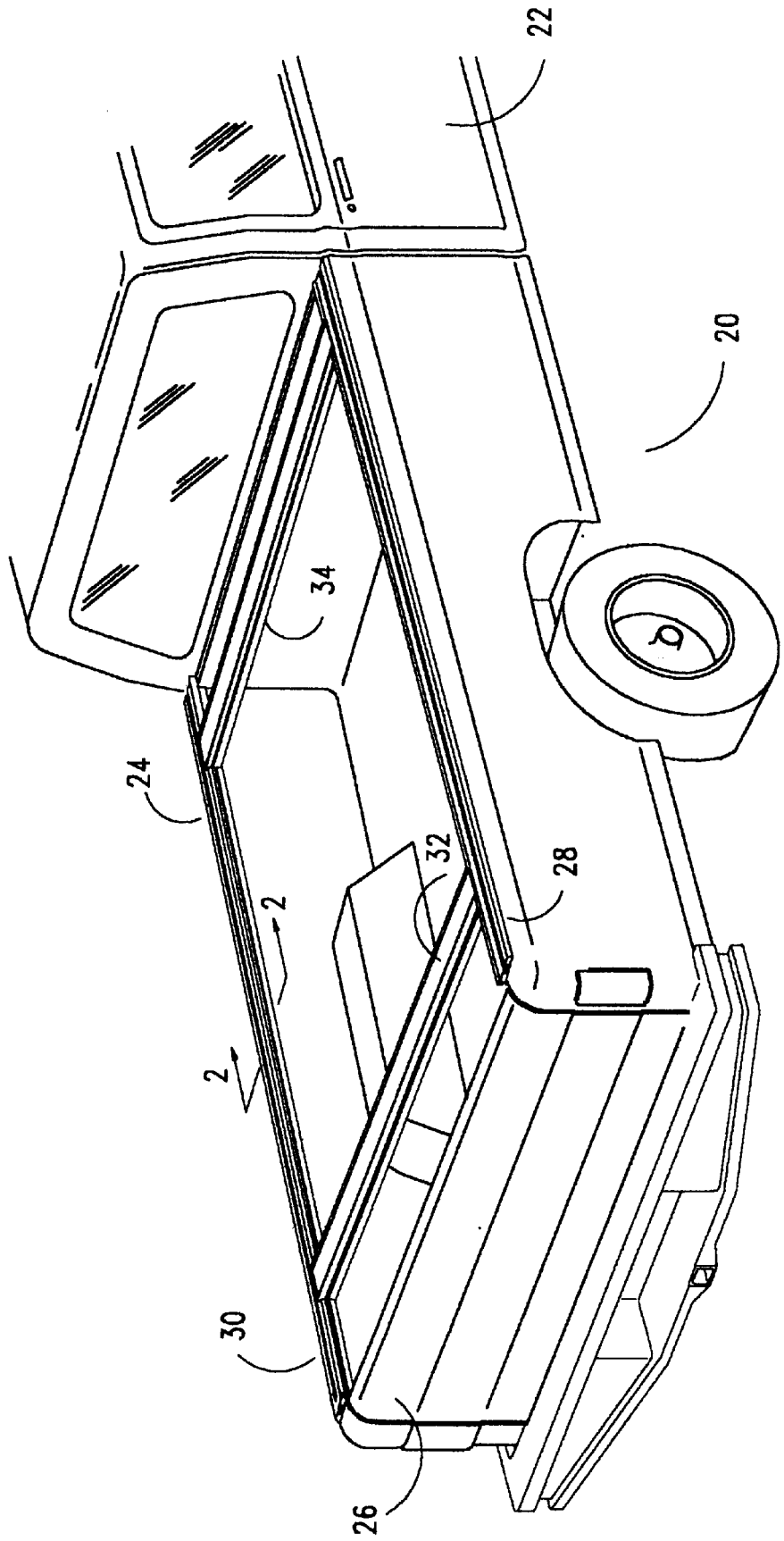
FIG. 1 is an isometric view of a rear part of a pickup truck carrying an attachment structure which incorporates a preferred embodiment of the attachment system having a pair of anchor rails mounted on respective side rails of a the pickup truck cargo bed, and two beams extending between the anchor rails.

Referring now to the drawings, FIG. 1 illustrates a conventional pickup truck designated generally by the numeral 20 and including a cab 22 and a cargo bed 24 having a tailgate 26 and on which a system incorporating a preferred embodiment of the invention is mounted. The system includes a pair of extruded anchor rails 28, 30 connected to adjustable extruded cross bed anchor beams 32, 34. The system forms a basis for adding various accessories, including attachment eyes, bed liners, covers, tool boxes and roll bars.

FIG. 2 which is a cross sectional view on line 2—2 of FIG. 1 shows anchor rail 30 (which is typical also of anchor rail 28) assembled on a side wall 36 of the pickup truck cargo bed 24 (FIG. 1). The anchor rail 30 is an elongate extruded member having a horizontal segment 38 adapted to rest on top of the side wall 36, and a vertical segment 40 extending downwardly inside the cargo bed adjacent a downwardly projecting internal flange 42. The vertical segment preferably includes a downwardly opening channel 44 to receive an interlocking removable member 46 shaped to connect to a bed liner section 48 which is held in place on the removable member 46 by a series of fasteners 50 which optionally pass through the flange 42, as shown.

The horizontal and vertical segments 38, 40 of the anchor rail 30 each have inside and outside walls. The outside walls embody respective stepped inverted T-slots 52 in the horizontal segment 38 and 54 in the vertical segment 40. The slots are shaped to receive anchoring devices or a decorative trim strip 56 and embody small external ledges 58 to either sides of the T-slot openings to control the depth of the decorative trim strip 56 and therefore ensure a consistent fit and resulting constant appearance.

The outside walls of the anchor rail 30 embody a plurality of formed shallow V-shaped grooves 60 to resist slippage of devices attached to the rail. Also, the anchor rail 30 has an integral vertically protruding ridge 62 positioned in line with the vertical segment 40 to project upwardly above the horizontal segment 38. The ridge 62 helps to limit water intrusion into the truck cargo bed when a cap or other structure is mounted on the rails, as will be explained.

The anchor rail 30 further includes an elongate T-slot 64 embodied in the inside horizontal wall to accept a flexible bulb type seal 66 providing a weather seal between the anchor rail 30 and the side wall 36 of the pickup truck cargo bed 24. Also, the anchor rail embodies an optional internal cavity 68 to reduce the volume of material used.

The elongate interlocking removable member 46 has an enlargement 70 at its top which is shaped to interlockingly slide into the channel 44 in the anchor rail 30. The removable member 46 further embodies a downwardly opening "U-shaped" channel 72 shaped to accept and secure the top of bed liner section 48.

A preferred mounting bracket 74 is seen in FIGS. 2 and 3. This bracket attaches to an inner side wall 76 of the truck cargo bed using suitable fasteners (not shown) through holes 78, and the brackets are so shaped that on assembly an integral nut 80 will be aligned with a countersunk opening 81 in the horizontal segment 38 of the anchor rail 30 so that a screw 84 can be driven into the nut to retain the rail 30 securely on the truck side wall 36.

It is also preferable to accommodate possible irregularities in the side wall. To accommodate this, a plurality of oversized, flexible, self-adhesive shims 86 (FIG. 4) are provided. The shaded area 88 displays how excess material can be taken off the shim 86 to provide a level surface for mounting on the anchor rail 30.

Reference is next made to FIG. 5 which better illustrates some details of the rail 30 and removable member 46. This member is a sliding fit in the channel 44 in the position shown. However, with a suitable bed liner section, the member 46 can be removed by rotation as indicated by arrow 89 in FIG. 8. Decorative end caps 90 (one of which is shown) are affixed to the ends of the anchor rail 30 using suitable self-tapping screws which engage in substantially cylindrical extensions 92, 94 of the T-slot 52 and cavity 68.

Reference is next made to FIG. 6 which illustrates a variety of means of attaching accessories to the anchor rail 30. The first is a standard carriage bolt 96 and the second is a T-slot nut 98, both of which can be used anywhere along the anchor rail 30. The bolt head can be entered into the slot using one of a series of notches 100 formed in one side of the slot and then moved along the slot.

Figure 8:
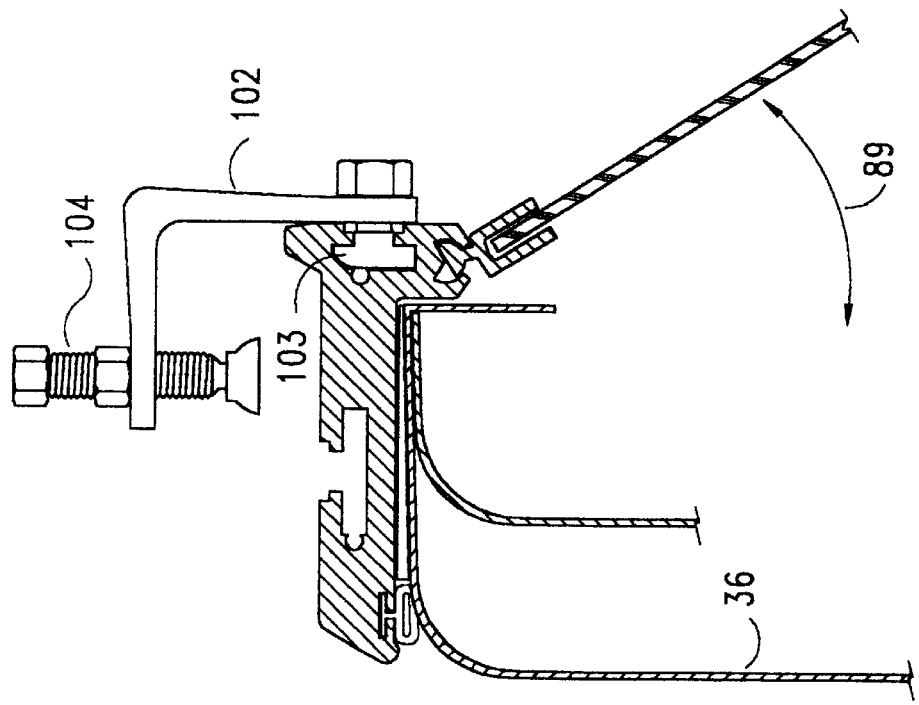
FIG. 8 is a cross sectional view of the second embodiment with the clamp inverted for use to secure various accessories to the anchor rail of the system and also showing how a section of a bed liner can be tilted for separation.
Figure 7:
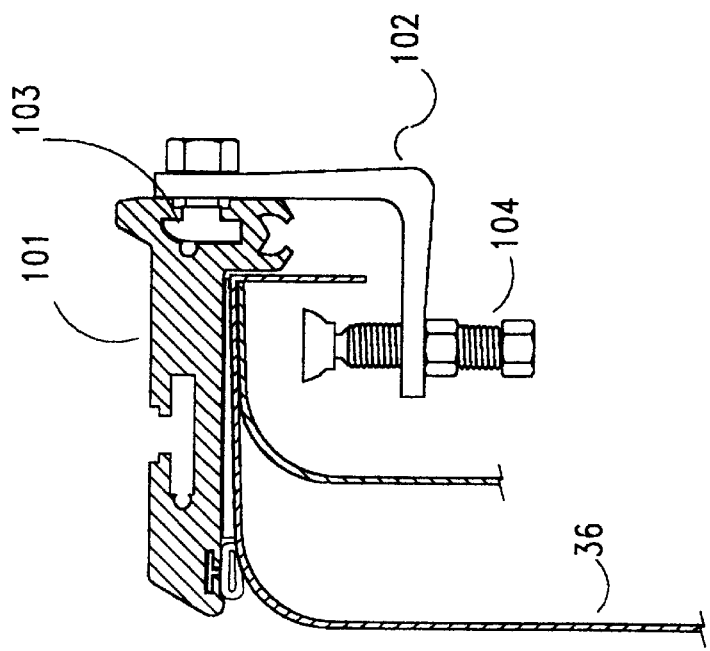
FIG. 7 is a view similar to FIG. 2 and showing a second embodiment of anchor rail including a series of clamps for removably attaching the anchor rail of the system to the cargo bed of the pick-up truck.

In the preferred embodiment of the cargo anchoring and protection system the anchor rail 30 (FIG. 2) is securely fastened to the truck cargo bed using bolts. However, other arrangements are possible. In a second embodiment shown in FIGS. 7 and 8, a simplified embodiment of anchor rail 101 is removably attached using a plurality of clamps 102 which are generally "L-shaped" and are adapted to be attached by engagement in a T-slot 103 in the anchor rail 101. A vertically adjustable threaded screw 104 is provided for tightening to securely attach the anchor rail 101 to the pickup truck side wall 36. The clamps 102 can also be used to secure truck caps and a variety of accessories to the anchor rail 101 as shown in FIG. 8.

Figure 9:
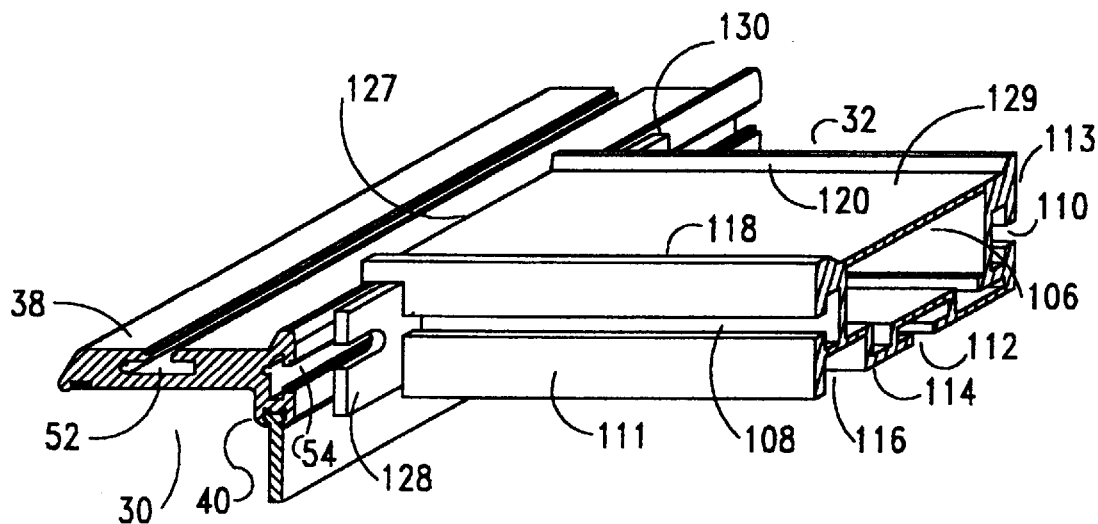
FIG. 9 is an isometric view of a portion of one of the anchor beams attached to one of the anchor rails of the system using the mounting bracket.

Reference is now made to FIG. 9 to describe cross bed anchor beam 32 (which is typical also of beam 34) of the system. The beam is made to be mounted across the top of the cargo bed 24 and attached to the anchor rails 28, 30 using the respective T-slots 54. The anchor beam 32 has a generally hollow rectangular cross section defining a substantially rectangular cavity 106 and includes T-slots 108, 110 on vertical walls 111, 113 and a further downwardly opening T-slot 112 in bottom wall 114, plus a recessed channel 116 to accept vertically placed cargo dividers 117. The vertical walls 111, 113 terminate at their upward extremities in respective upwardly extending ridges 118, 120 which serve both as guide rails and also as drain ridges to direct rain water longitudinally of the beams as will be explained.

Figure 10:
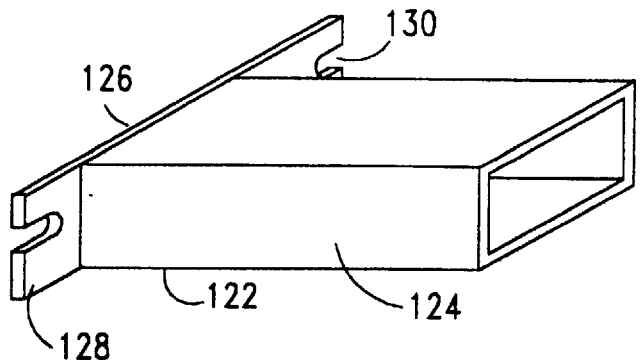
FIG. 10 is an isometric view of an anchor beam mounting bracket used in the assembly shown in FIG. 8.

As seen in FIG. 10, a mounting bracket 122 has a main body 124 and a slotted plate 126 affixed to the body. The plate includes a pair of slotted projections 128, 130 to accommodate fasteners such as bolt 96 in FIG. 6. These fasteners attach the bracket 122 on the rails 28, 30 (see also FIG. 1) with the body of the bracket engaged in the beam to fix the beam orthogonally with respect to the anchor rails 28, 30

It should be noted that the structure is such that the beam is free to move lengthwise on the mounting brackets 122 within limits and this is to accommodate inaccuracies in assembly and also, and more importantly, to accommodate the fact that the side walls of the cargo bed are often designed to be slightly out of parallel. In effect, the beam is telescopic with reference to the rails with the movement accommodated by sliding between the beam and one or both mounting brackets at the ends of the beam. If preferred, one of the brackets can be attached to the beam and the movement taken up at the other bracket.

An exemplary use of the attachment system will now be described with reference to FIG. 11. The rails 28, 30 (see also FIG. 1) are connected to beam 32. It will be seen in this view that the attachment is such that an upper surface 129 of the beam is bordered by the parallel ridges 118, 120 and that the surface 129 is raised above ridge 62 on the rail 30. This is also illustrated in FIG. 9 when it can be seen that the beam 32 extends mainly below the horizontal segment 38 of the rail 30 and includes an overhang 127 made up of end portions of the upper surface 129 and ridges 118, 120. From these illustrations it will be evident that any water on surface 129 will tend to flow between ridges 118, 120 and on to the top surface of the rail. The rail ridge 62 will then prevent flow into the cargo bed.

Figure 11:
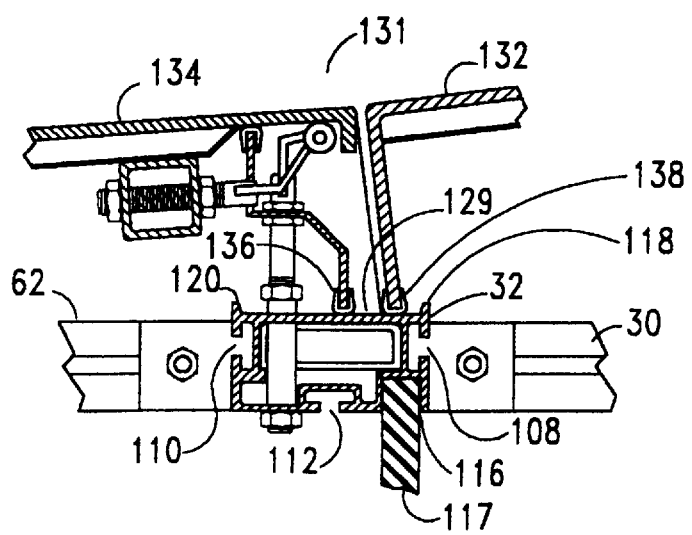
FIG. 11 is a cross sectional view showing how typical accessories can be added to the system.

An example of a structure which takes advantage of this arrangement is shown in FIG. 11. A cover 131 is made up of hinged lids 132, 134 which rest on the side rails 28 (not seen in this view) and 30 and meet on the beam 32 resting on the surface 129 between the ridges 118 and 120. Some water will find its way between the lids 132, 134 and fall between associated flexible strips 136, 138 before flowing along the beam on surface 129 guided by the ridges 118, 120. Similarly, the ridge 62 will guide water received from the beam to flow off the rails and not into the bed of the pickup truck.

It will now be understood that the anchor rails 28, 30 (FIG. 1) combine with anchor beams such as beam 32 to provide an attachment system capable of assembly on truck cargo beds which have walls which are note entirely parallel. Also, the beam is attached to the vertical segment with a top surface 129 of the beam extending over rib 62 on the rails to guide water off the beam and then outwardly off the rails.

There are many possible variations in design of the attachment system within the scope of the description and claims, and all such variations are incorporated into the claimed embodiments by reference to the preferred embodiments which are exemplary to the described invention.

I claim:

1. An attachment system for use in mounting attachments and loads in the cargo bed of a pickup truck, the cargo bed having side walls, and the attachment system including:

first and second anchor rails, each of the rails having a horizontal segment and a vertical segment for positioning over the top of one of the side walls of the cargo bed with the vertical segments positioned inside the walls and projecting downwardly from the respective horizontal segments;

at least one anchor beam including a top surface bordered longitudinally by a pair of upstanding ridges to guide surface water along the anchor beam;

a pair of mounting brackets coupled to opposite ends of the anchor beam, at least one of the brackets being slidable relative to the anchor beam to provide a predetermined length of telescopic adjustment sufficient to accommodate variations of the side walls from parallel; and fasteners engageable in the anchor rails and the mounting brackets to fix the anchor beam in a selected position along the length of the anchor rails with the anchor beam arranged substantially orthogonally with respect to the anchor rails.

2. An attachment system as claimed in claim 1 in which the anchor rails define T-slots in the vertical segments to receive said fasteners.

3. An attachment system as claimed in claim 1 in which each of the anchor rails further includes a longitudinally extending upstanding ridge extending in line with the vertical segment and above the horizontal segment, and in which said top surface extends over the ridges on the rails to carry said water from the anchor beam onto the anchor rails where the water is restrained from flowing into the truck cargo bed by said ridges on the rails.

4. An attachment system as claimed in claim 1 in which: the anchor beam defines a longitudinally extending cavity; the anchor rails define T-slots in the vertical segments, and said at least one of the mounting brackets includes a main body which is a sliding fit in the cavity to provide said telescopic adjustment and includes slotted projections aligned with one of the T-slots to combine with the fasteners for connecting the mounting bracket to one of the anchor rails.

5. An attachment system as claimed in claim 4 in which the cavity and the main body have rectangular cross sections.

6. An attachment system for use in mounting attachments and loads in the cargo bed of a pickup truck, the cargo bed having side walls, and the attachment system including:

first and second anchor rails, each of the rails having a horizontal segment and a vertical segment for positioning over the top of one of the side walls of the cargo bed with the vertical segment positioned inside the wall and projecting downwardly from the horizontal segment;

at least one anchor beam;

a pair of mounting brackets coupled to opposite ends of the anchor beam, at least one of the brackets being slidable relative to the anchor beam to provide a predetermined length of telescopic adjustment sufficient to accommodate accepted variations of the side walls from parallel; and the mounting brackets and vertical segments of the anchor rails having cooperating structure to receive fasteners to attach the anchor beams to the anchor rails with the anchor beam being mainly below the horizontal segments and projecting above the horizontal segments;

the anchor beam including a top surface and a pair of parallel ridges projecting upwardly from the anchor beam and extending longitudinally to channel water along the beam, the anchor beam including an overhang consisting of end portions of the top surface and the pair of ridges; and each of the anchor rails including a further ridge to be positioned below the overhang such that water from the anchor beam will fall on the anchor rails and be restrained from flowing into the truck cargo bed by said further ridges.

7. An attachment system as claimed in claim 6 in which the anchor rails define T-slots in the vertical segments to receive said fasteners.

8. An attachment system as claimed in claim 6 in which the anchor beam defines a longitudinally extending cavity and in which said at least one of the mounting brackets includes a main body which is a sliding fit in the cavity to provide said telescopic adjustment.

9. An attachment system as claimed in claim 8 in which the cavity and the main body have rectangular cross sections.

10. An attachment system as claimed in claim 8 in which the anchor rails define T-slots in the vertical segments to receive said fasteners.

* * * * *